United States Patent [19]

Hoffmann

[11] Patent Number: 4,773,891

[45] Date of Patent: Sep. 27, 1988

[54] DRIVE SHAFT OF FIBRE-REINFORCED PLASTIC MATERIAL

[75] Inventor: Werner Hoffmann, Siegburg, Fed. Rep. of Germany

[73] Assignee: Uni-Cardan Aktiengesellschaft, Siegburg, Fed. Rep. of Germany

[21] Appl. No.: 25,890

[22] Filed: Mar. 16, 1987

[30] Foreign Application Priority Data

Mar. 15, 1986 [DE] Fed. Rep. of Germany ....... 3608754

[51] Int. Cl.$^4$ .............................................. F16C 3/02
[52] U.S. Cl. ..................................... 464/181; 464/183
[58] Field of Search ...................... 138/109, 129, 130; 285/423; 464/87, 88, 97, 181, 182, 183

[56] References Cited

U.S. PATENT DOCUMENTS

| 3,651,661 | 3/1972 | Darrow | 464/181 |
| 4,173,128 | 11/1979 | Corvelli | 464/183 X |
| 4,283,446 | 8/1987 | McLain | |
| 4,540,385 | 9/1985 | Krude | 464/181 X |
| 4,605,385 | 8/1986 | Puck et al. | 464/181 |

FOREIGN PATENT DOCUMENTS

| 0122033 | 10/1984 | European Pat. Off. | |
| 2058016 | 8/1971 | Fed. Rep. of Germany . | |
| 2950581 | 12/1979 | Fed. Rep. of Germany . | |
| 8129867 | 10/1981 | Fed. Rep. of Germany . | |
| 3007896 | 3/1985 | Fed. Rep. of Germany . | |
| 3421191 | 12/1985 | Fed. Rep. of Germany . | |
| 946068 | 1/1964 | United Kingdom | 464/88 |
| 2087042 | 5/1982 | United Kingdom | 464/181 |
| 2146097 | 8/1984 | United Kingdom . | |

Primary Examiner—Daniel P. Stodola
Attorney, Agent, or Firm—Toren, McGeady & Associates

[57] ABSTRACT

A drive shaft of hollow form and of fibre-reinforced plastics material, has an end provided with an integral radially inwardly extending flange and one or more connecting members for effecting torque transmission with such flange. The flange may have a single central bush or the like, or a number of circumferentially distributed bushes, bolts or pins for torque transmission. Further a method of manufacturing such a drive shaft by fibre winding includes chordal winding of fibres to provide the flange, and a device for forming the flange during the winding process.

6 Claims, 4 Drawing Sheets

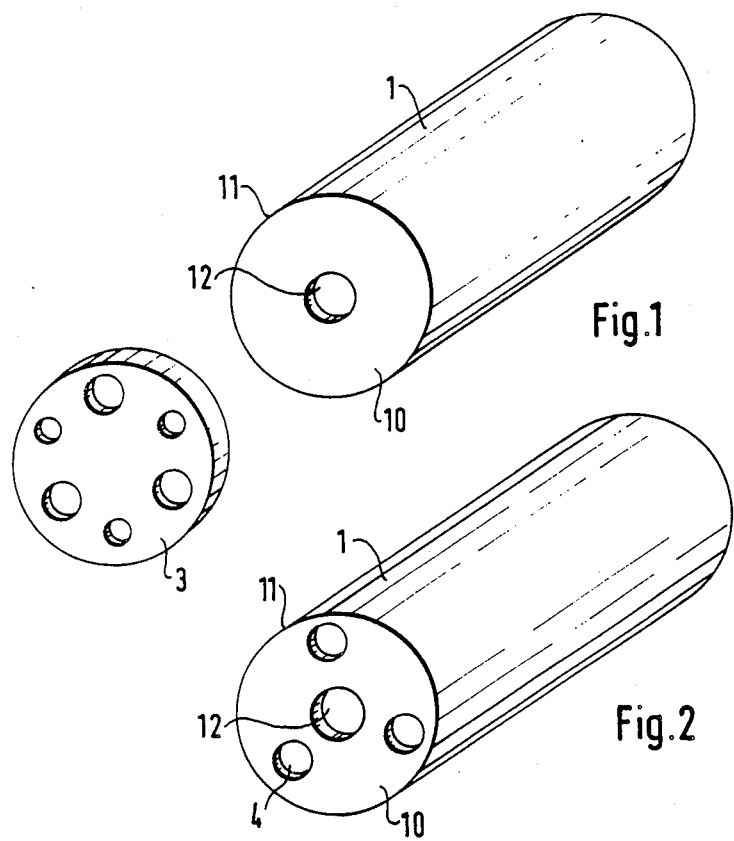
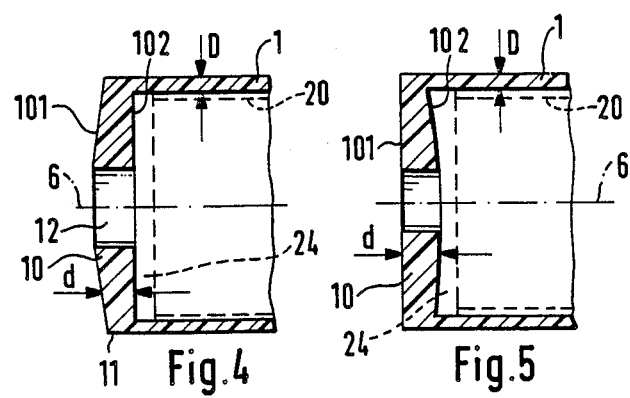

4,773,891

DRIVE SHAFT OF FIBRE-REINFORCED PLASTIC MATERIAL

BACKGROUND TO THE INVENTION

1. FIELD OF THE INVENTION

This invention relates to a drive shaft of hollow form and made of fibre-reinforced plastics material. More particularly, the invention relates to the provision at an end of such a shaft of a connecting means by which a torque transmitting connection is established with the shaft. The invention also relates to a method of manufacturing such a shaft, and to a device for use in its manufacture.

A shaft according to the invention may be used as the propeller shaft of a motor vehicle.

2. DESCRIPTION OF PRIOR ART

In motor vehicle engineering, numerous attempts have been made to reduce vehicle weight and a particular reduction in weight can be achieved by use of a hollow shaft of fibre-reinforced plastics material. The problem with such shafts is the provision of a satisfactory torque transmitting connection at the end of the shaft, and there have been many proposals for such connections.

For example, DE-PS No. 3007896 proposes the use of a tubular metal sleeve having a flange formed at its end and with an internal profile such that, when it is axially slidden onto a pre-produced fibre-reinforced plastics shaft, the profile cuts into the shaft thereby establishing a driving connection.

In DE-OS No. 3421191, there is proposed the use of a tubular metal sleeve inserted into a hollow shaft and having a metal flange.

In DE-OS No. 2950581, there is proposed the use of a multi-component connecting element which is clamped to the end of a hollow fibre-reinforced plastics shaft.

In GB-OS No. 2146097, there is proposed the use of a metal connecting element with a flange portion and a tubular sleeve which is attached to the end of a shaft by incorporating it in the structure of the shaft while the shaft is being produced by helical winding of fibres impregnated with a hardenable resin.

All the above designs of connecting means for drive shafts made of fibre-reinforced plastics material have a disadvantage in that the use of a metal connecting element, usually with a flange portion, adds to the weight of the shaft and to some extent negates the potential weight saving. Further, the critical speed of the shaft with regard to bending thereof in use is reduced.

Furthermore, such prior art torque transmitting connections only introduce torque to the tubular shaft by way of the layer of fibres thereof which is nearest the tubular sleeve engaging the shaft. Torsional forces cause shear stresses between the layers of fibres forming the shaft, which stresses are at a maximum in the fibre layer immediately adjacent the tubular sleeve. The torque transmitting ability of the connection is determined by the inter-laminar shear strength of the layers of fibres constituting the shaft.

SUMMARY OF THE INVENTION

Accordingly, it is the object of the present invention to provide an improved connecting means for a torque transmitting connection with a fibre-reinforced plastics drive shaft. Simultaneously, the connecting means has to meet requirements in respect of torsional strength, axial security, and concentricity.

The present invention provides a drive shaft of hollow form of fibre-reinforced plastics material, having an end integrally formed with a radially inwardly extending flange, and connecting means in said flange for establishing a torque transmitting connection with the shaft.

By providing the end of the drive shaft with a radially inwardly extending flange according to the invention, the necessity for additional heavy metal parts incorporating tubular sleeves and/or flanges is eliminated, or at least reduced, so that the drive shaft is not burdened by additional weight and the bending-critical speed is not disadvantageously lowered.

In a shaft according to the invention, torque may be introduced, for example, by a flexible joint disc connected by bolts to the inwardly extending flange. Preferably, of course, such bolts are as near as possible to the periphery of the flange so that the forces thereon are as low as possible. Torque is then transmitted between the flange and hollow shaft without introducing inter-laminar shear stresses.

In one embodiment of the invention, the flange may be provided with circumferentially distributed axially extending apertures to form the connecting means therein. Preferably they are equally spaced about the flange. Such apertures should preferably be as close as possible to the outer periphery of the flange to reduce forces thereat to the lowest possible values. Such apertures may receive holding elements such as bolts, pins or bushes to facilitate connection of torque transmitting elements thereto.

Such bolts, pins or bushes may have abutment formations which engage the surface of the flange within the hollow shaft, to prevent such bolts, pins or bushes from being pulled out of the flange. Such elements facilitate connection to the flange.

Where bushes are provided in the flange, they may be flush with the outer surface thereof. Whatever form of holding elements are utilized, whether bolts, pins or bushes, they preferably do not extend beyond the outer diameter of the hollow shaft, so that the space required for the connecting means is minimized and the whole shaft is of compact design.

In a further embodiment of the invention, the connecting means may comprise a bush received in a central aperture in the radially inwardly extending flange. Whether one or a plurality of bushes are used, they may have an outer surface which is profiled to increase the security of connection of the bush to the flange, e.g. by increasing the area of contact with the fibre-reinforced plastics material.

The wall thickness of a hollow drive shaft is determined by the magnitude of the torque to be transmitted in use. According to the invention, the wall thickness of the flange is at least as great as the wall thickness of the hollow shaft, and preferably greater. Thus the flange is always adequately dimensioned in view of the torque to be transmitted. Such an increase in wall thickness of the flange is readily achieved by the method hereafter described.

Techniques for manufacturing hollow drive shafts of fibre-reinforced plastics material are well known. Strands of fibres impregnated with hardenable resin are wound on a mandrel in a succession of right handed and left handed helical movements. It is also possible to apply an axially extending reinforcement if desired. It is also possible to incorporate metal connecting means in such winding process, such as described in GB-OS 2146097. After the shaft has been wound, it is subjected to treatment usually at elevated temperature to harden the resin and form the finished shaft. Strands of fibres used in the winding process may be pure strands or filaments, and/or woven strips of fibres, the fibres typically being glass fibres and/or carbon fibres. Suitable resins may be those based on epoxy resins, but other resins or mixtures thereof can be utilized.

The present invention provides, according to a further aspect thereof, a method of manufacturing a hollow drive shaft by helically winding fibres impregnated with hardenable resin onto a mandrel, wherein said fibres are wound helically in one direction along the mandrel, chordally across an annular end face of or associated with the mandrel, and helically in the opposite direction along the mandrel, to form the shaft with an integral radially inwardly extending flange at its end.

The flange may be wound in such a way that it forms a plane end surface.

Because of the reduction in the radius at which the fibres are being deposited, an increase in wall thickness of the inwardly extending flange is automatically achieved. Hence there is no need for any additional reinforcement of the flange.

Axially extending circumferentially distributed apertures may be formed in the flange in the course of the winding process.

In a preferred embodiment of the process according to the invention, holding means such as bushes, bolts, pins or the like may be incorporated in the flange in the course of the winding process.

Manufacture of a shaft by the method according to the invention requires facilities whose essential elements are:
- a stand containing supply of fibres to be wound;
- means for ensuring uniform tensioning of such fibres;
- means for impregnating the fibres with resin;
- a mandrel with means for holding it and driving it;
- means for guiding the fibres uniformly to a mandrel.

The invention provides, according to a further aspect, a device for use in manufacture of a drive shaft, comprising a tubular mandrel and a flange-winding element whose outer diameter corresponds to the outer diameter of the mandrel, the flange-winding element being provided at an end of the mandrel and held thereto by a removable central fixing device which extends axially through the mandrel and the flange-winding element.

The flange-winding element provides a surface on which the chordally extending fibres which form the flange at the end of the hollow drive shaft are deposited during the winding process. The flange-winding element may have an outer face which extends generally radially, preferably at an angle determined by the increase in thickness of the flange obtained as the radius reduces at which the fibres are deposited.

The flange-winding element may have, preferably uniformly, distributed recesses for receiving holding means such as bushes or bolts which are to be incorporated in the flange in the course of the winding process. Such holding means may be held to the flange winding element in such a way that they can easily be removed therefrom after the drive shaft has been manufactured.

When holding means are being thus used, they may be provided with covering caps which extend axially and which facilitate winding of fibres around the holding means. Such covering caps can be removed after the winding process has been completed.

If a hollow drive shaft of small diameter is to be wound, and if an inwardly extending flange is required to be provided at one end only thereof, it is possible to use a simple tubular mandrel. If an inwardly extending flange is required to be provided at both ends of the shaft, a collapsible or so-called "lost" mandrel has to be used. The flange-winding element may be provided with a sleeve which fits within the mandrel, to ensure that the element is correctly positioned relative to the mandrel. Of course, flange-winding elements of different designs may be used for different designs of flanges. Holding means to be incorporated in a flange may be inserted into the recesses in the flange-winding element and held therein by a releasable adhesive, to enable the element to be removed with the mandrel after the winding process.

The invention thus provides for economic production of drive shafts which are of light weight and have connecting means which are space saving. Connection to the shaft is achieved without requiring to bore holes therein, which would damage the fibres, and a minimum of additional components are required.

BRIEF DESCRIPTION OF DRAWINGS

The invention will now be described by way of example with reference to the accompanying drawings, of which:

FIGS. 1 and 2 are perspective views of drive shafts with differently designed end flanges;

FIGS. 4 and 5 are longitudinal sections through end portions of slightly different embodiments of drive shaft according to the invention;

Throughout the drawings, like parts are identified by like reference numerals.

DESCRIPTION OF PREFERRED EMBODIMENTS

Figure 3:
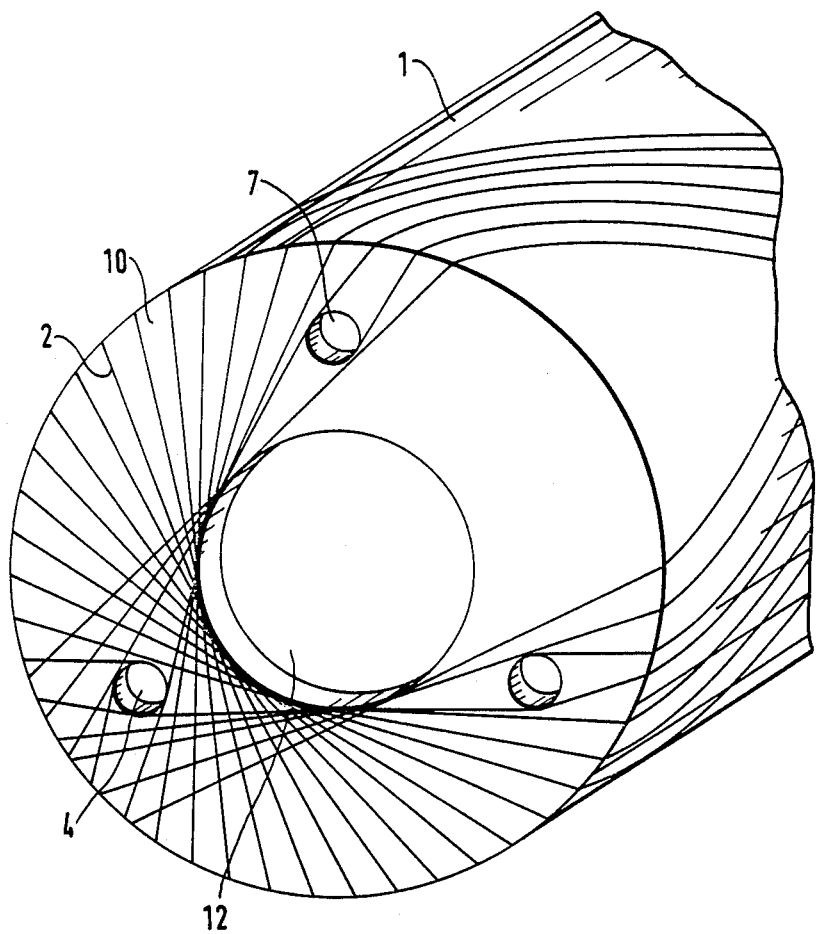
FIG. 3 is a perspective view of the drive shaft of FIG. 2 showing the manner in which fibres are disposed therein.

Referring firstly to FIG. 1, there is shown a hollow shaft 1 provided at its end 11 with a radially inwardly extending flange 10. The flange 10 has a central aperture 12. The shaft and flange are made of fibre-reinforced plastics material, by a winding method as described hereafter so that the flange 10 is integral with the shaft 1. For use, as e.g. a motor vehicle propeller shaft, torque is transmitted to the shaft 1 by way of the flange 10, e.g. by way of a flexible coupling disc 3 which may be secured by bolts which engage apertures, not shown, in the flange 10.

FIG. 2 shows a shaft end portion as FIG. 1 but in which the flange 10 has been provided with three equally circumferentially spaced apertures 4 which may be provided with holding means such as bushes to be described hereafter.

FIG. 3 shows on an enlarged scale a shaft end portion as FIG. 2, and depicts diagrammatically the disposition of fibres therein. Fibre strands 2, whether individual filaments or bunches or woven strands thereof, extend helically along the shaft from one end to the other, chordally across the end flange thereof, and then helically back along the shaft in the opposite direction. Where apertures 4 which may contain holding means such as bushes 7 are encountered, the fibres may deviate from being straight chordal lines. The arrangement in the finished shaft and flange is such that bushes 7 are firmly held in the flange, or apertures 4 have well defined boundaries.

Because of the decreased diameter at which the fibres are being applied to the flange adjacent its central aperture 12, the wall thickness d of the flange increases nearer its centre, and in any event is greater than the wall thickness D of the shaft 1. FIGS. 4 and 5 show how the wall thickness d may vary. In FIG. 4, the outwardly facing surface 101 of the flange is generally of convex form, while the surface 102 of the flange facing the interior of the hollow tubular drive shaft 1 is planar. In FIG. 5, the outwardly facing surface 101 is planar and the inwardly facing surface 102 is convex. Of course, configurations other than these two are possible. In FIGS. 4 and 5, the rotational axis of the drive shaft is indicated as 6.

FIG. 4 shows, within the hollow drive shaft 1, a tubular mandrel 20 on which the shaft is manufactured by winding fibres in the manner of FIG. 3. At the end of the mandrel 20, a disc-like element 24 is provided on which the flange 10 is wound. The configuration of such flange-winding element 24 is chosen to provide the required configuration of the outwardly and inwardly facing surfaces 101, 102 of the flange 10.

Figure 6:
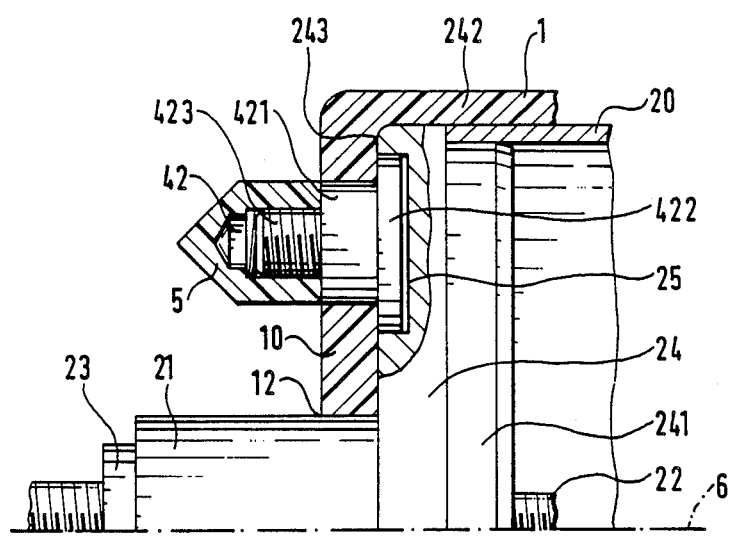
FIG. 6 is a longitudinal cross-section through part of an end portion of a drive shaft during manufacture thereof.

FIG. 6 shows in greater detail an end portion of a tubular mandrel 20, and a disc-like element 24 on which the inwardly extending flange at the end of shaft 1 is formed by fibre winding. The outer diameter of the flange-winding element 24 corresponds to that of the mandrel 20, and the element 24 has an axially projecting collar 241 which fits within the mandrel 20 with the end surface of the latter abutting a step surface 242 of the element 24. The outwardly facing surface 243 of the element 24, which surface is planar in this example, is provided with a number of circumferentially equally distributed recesses 25. The element 24 and mandrel 20 are held together by a tensioning rod 21, threaded rod 22 and nuts 23.

Recesses 25 receive the heads 422 of bolts 42 which are to be incorporated in the flange 10 in the winding process to provide connecting means. Each of the bolts 42 has a threaded portion 423, a shank 421 of relatively larger diameter, and head 422 of still larger size. When the shaft 1 and flange 10 have been formed by winding, the head 422 prevents the bolt from being pulled out of the flange 10. To protect the threaded portion 423 during the winding process, a cap 5 may be fitted thereon for the winding process, abutting the shank 421, and this prevents resin material contaminating the screw threads thereof. Cap 5 may be held by a removable adhesive during the winding process, or simply may be a push-fit on the end of the bolt. Caps 5 may be made, for example, of plastics material.

The heads 422 of bolts 42 may be held in the recesses 25 by, for example, a releasable adhesive during the winding process, enabling the element 24 to be removed after the winding process has been completed.

Figure 8:
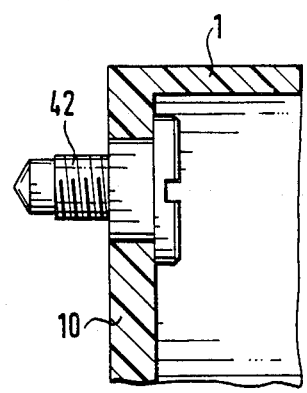

FIG. 8 shows the shaft 1 and flange 10 at the end thereof, and a bolt 42 after the mandrel and associated parts have been removed therefrom. A plurality of uniformly circumferentially distributed bolts 42 may provide for direct connection to, for example, a flexible rubber and/or fabric coupling disc.

Figure 7:
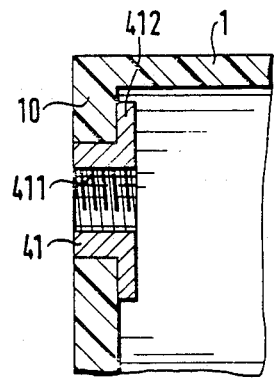
FIGS. 7 to 10 are partial longitudinal cross-sections through the ends of different embodiments of drive shaft.

Instead of bolts 42, bushes may be provided in the flange 10, and an example thereof is shown in FIG. 7. Bush 41 is headed with a flange 412 which is received in a recess in element 24 during manufacture by a winding process. The bush has a threaded bore 411 for receiving a screw or bolt for connection purposes. A cap may be fitted to the bush to close the bore 411 during the winding process to prevent access of resin to the screw threads thereof.

Figure 9:
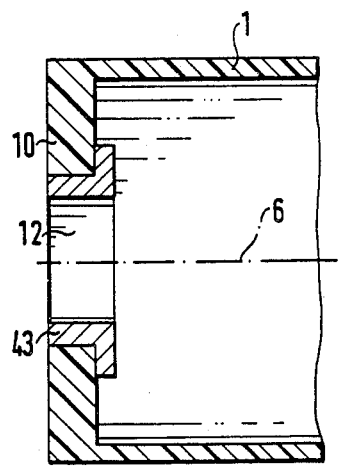
Figure 10:
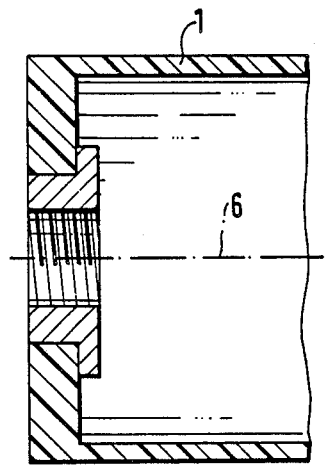

FIGS. 9 and 10 show how a single threaded (FIG. 10) or unthreaded (FIG. 9) bush 43 may be incorporated at the centre of flange 10. During the winding process, such a bush would simply be positioned on the tensioning rod 21, and the element 24 would be appropriately configured to co-operate therewith.

During the winding process, bushes as 43 may be protected by a suitable covering cap against ingress of resin to an undesired position. In all the embodiments above described, the external surface of the bush, pin or bolt incorporated in the flange during the winding process may be configured, e.g. knurled, to increase its security of attachment within the flange. Such configuration may provide an extended surface area with which the resin impregnated fibres make contact.

The invention thus provides a readily manufactured, light weight, and space saving, torque transmitting connection with a drive shaft.

I claim:

1. A drive shaft formed of fibre-reinforced plastics material and comprising an axially elongated hollow shaft having a first end and a second end and a flange formed integrally with said shaft at the first end thereof and extending radially inwardly from said shaft and transversely of the axially direction of said shaft, said flange having at least one aperture extending therethrough in the axial direction of said shaft and arranged to receive a torque transmitting element, said shaft and flange are formed of continuous fibre strands impregnated with hardenable resin with the fibre strands wound continuously helically about and spaced outwardly from the shaft axis from the second end to the first end and then wound generally chordally relative to the axis of said shaft across said first end and then wound helically about the shaft axis from the first end to the second end before reversing direction back to the first end in the continuous winding operation.

2. A drive shaft, as set forth in claim 1, wherein a plurality of said apertures are formed in said flange equiangularly spaced apart and spaced radially outwardly from the axis of said shaft and a connecting member secured in each of said apertures.

3. A drive shaft, as set forth in claim 2, wherein said connecting members are formed of metal.

4. A drive shaft, as set forth in claim 2, wherein said flange has a first transversely extending face facing into said hollow shaft and a second transversely extending face facing opposite to said first face, and said connecting members having an annular abutment surface bearing against said first face of said flange.

5. A drive shaft, as set forth in claim 4, wherein said connecting members located in the apertures through said flange have annular abutment surfaces in contact with said first face of said flange.

6. A drive shaft, as set forth in claim 1, wherein said shaft has a uniform thickness between said first and second ends thereof, and flange has an increasing thickness extending radially inwardly from said shaft.

* * * * *